United States Patent [19]

Striebich

[11] Patent Number: 4,590,766
[45] Date of Patent: May 27, 1986

[54] EXHAUST GAS STEAM TURBINE DRIVE UNIT FOR AUTOMOTIVE VEHICLES

[75] Inventor: Helmut Striebich, Karlsruhe, Fed. Rep. of Germany

[73] Assignee: Dr. Ing. H.c.F Porsche AG, Fed. Rep. of Germany

[21] Appl. No.: 631,078

[22] Filed: Jul. 16, 1984

[30] Foreign Application Priority Data

Jul. 27, 1983 [DE] Fed. Rep. of Germany ....... 3326992

[51] Int. Cl.⁴ .......................... F01K 23/10; F02G 5/02
[52] U.S. Cl. ..................................................... 60/618
[58] Field of Search .............. 60/616, 618, 670, 39.19, 60/39.51 R, 39.51 H

[56] References Cited

U.S. PATENT DOCUMENTS

| | | | |
|---|---|---|---|
| 2,283,176 | 5/1942 | Birmann | 60/682 X |
| 2,379,183 | 6/1945 | Price | 60/618 X |
| 3,350,876 | 11/1967 | Johnson | 60/618 |
| 4,294,074 | 10/1981 | Striebich | 60/616 |
| 4,406,127 | 9/1983 | Dunn | 60/618 |

FOREIGN PATENT DOCUMENTS

| | | | |
|---|---|---|---|
| 454396 | 1/1928 | Fed. Rep. of Germany | 60/618 |
| 138943 | 10/1934 | Fed. Rep. of Germany | 60/618 |

Primary Examiner—Michael Koczo
Attorney, Agent, or Firm—Barnes & Thornburg

[57] ABSTRACT

This drive unit comprises an internal combustion engine and a waste heat turbine unit wherein the energy contents of the exhaust gas are utilized. The waste heat turbine unit is provided with a rotating cylinder fashioned as a hollow member, carrying on its outside blading exposed to the exhaust gases. A medium convertible into steam is supplied by means of a device to the inside of the cylinder. This medium expands in the steam turbine unit with the generation of power.

37 Claims, 5 Drawing Figures

EXHAUST GAS STEAM TURBINE DRIVE UNIT FOR AUTOMOTIVE VEHICLES

BACKGROUND AND SUMMARY OF INVENTION

The invention relates to drive units and more particularly to internal combustion engines having a waste heat turbine unit operated by the exhaust gases of the internal combustion engine, wherein the energy contents of the exhaust gas are utilized. The invention is particularly well suited for automotive vehicles.

In a conventional drive unit (German Pat. No. 27 57 236) of the type of construction described above, it has been discovered by testing, that utilization of the energy contents in the exhaust gases of the internal combustion engine is basically possible. However, it seems that the type of waste heat turbine unit, the feeding of the medium, its conversion to steam, and, finally, the exploitation of the steam for ensuring a high degree of efficiency can be optimized.

Therefore, it is an object of the invention to improve this drive unit in such a way that it is safe in operation and yields a high degree of efficiency with the use of readily producible structural components.

According to the invention, in a drive unit including an internal combustion engine and a waste heat turbine unit operated by the exhaust gases of the internal combustion engine for utilizing the energy from the exhaust gases, a waste heat turbine unit is provided. The waste heat turbine unit compries a cylinder member having an exterior and a hollow interior. Blading is provided which is exposed to the exhaust gases and is carried on the exterior of the cylinder member. A steam turbine unit is provided along with means for supplying a liquid medium, convertible into steam, to the interior of the cylinder member. The liquid medium is expandable in the steam turbine unit for generating power.

The advantages primarily attainable by the invention are to be seen in that the waste heat turbine unit operates at a relatively high degree of efficiency and is a compact assembly wherein utilization of the energies contained in the exhaust gas are readily realizable. On account of the blading of the rotating cylinder, a relatively large surface area is provided which, besides yielding satisfactory heat transfer values, is important for the transmissible heat flow. As a consequence, a favorable weight-to-surface ratio of the cylinder is obtained. By the instant invention's manner for feeding the liquid medium to the inner wall of the cylinder, film evaporation is attained, accompanied by a high heat transfer coefficient and good cooling of the cylinder. Also, the temperature level is maintained low by this feature, so that high temperature-resistant turbine materials need not be used. The cylinder can be made of an aluminum alloy.

The housing, (which, with an appropriate internal coating, can also be made of an aluminum alloy,) the cylinder, and the steam turbine unit are components that can be manufactured without any problems. Also, they can be dimensioned in size and arranged spatially with respect to one another in such a way that the waste heat turbine unit represents a compact module which can be attached to the internal combustion engine in a simple way.

The blading exposed to the exhaust gases is provided merely in the zone of the exhaust gas inlet which can be easily put into practice from the viewpoint of manufacturing technique, and contributes toward weight reduction. A satisfactory driving function of the cylinder is obtained by arranging the blading on two spaced-apart wheel rims and having these exposed to tangential flow. These wheel rims can either be produced integrally with the cylinders or can also be formed by separate components.

A satisfactory feeding of the liquid medium is effected via the atomizer nozzles and the centrifugal pump. The latter can be intergrated into the cylinder in a simple way.

The superheater provided within the cylinder enhances the high degree of efficiency of the steam turbine unit. The use of the oppositely rotating turbine wheels and their structure ensures satisfactory operation of the steam turbine unit.

By connecting a mixture condenser installed in the housing downstream of the steam turbine unit, an additional condenser can be eliminated.

Preheating of the conduit leading to the device by means of the exhaust gases likewise contributes toward optimizing of the operation.

Finally, the control device ensures safe and effective operation of the waste heat turbine unit.

Further objects, features and advantages of the present invention will become more apparent from the following description when taken with the accompanying drawings which show, for purposes of illustration only, embodiments in accordance with the present invention.

DETAILED DESCRIPTION OF THE DRAWINGS

Figure 1:
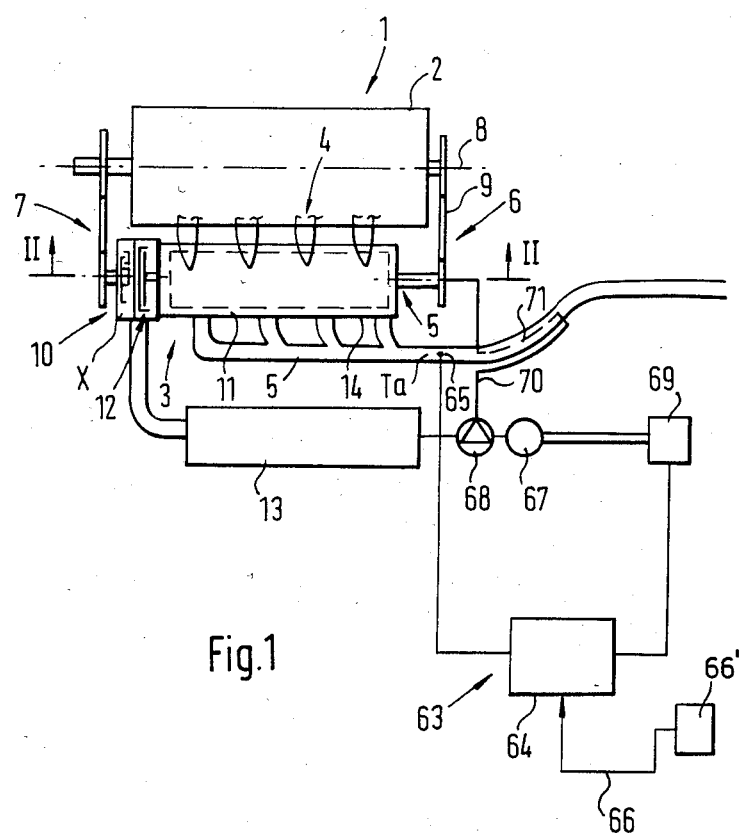
FIG. 1 is a diagramatic view of the drive unit of the present invention.

The drive unit 1, which can be installed in an automotive vehicle or alternatively operates in stationary operation (energy supply), comprises an internal combustion engine 2 and a waste heat turbine unit 3. The waste heat turbine unit 3 is connected to outlet ducts 4 of the internal combustion engine 2, and thus is operated by exhaust gases from the internal combustion engine 2 which comprises, for example, four cylinders. Numeral 5 denotes an exhaust gas conduit which is part of the waste heat turbine unit 3.

The waste heat turbine unit 3 utilizes the energy contents of the exhaust gases from the internal combustion engine 2 to generate power. The thus-obtained power, which can be utilized for increasing the power of the engine or for reducing consumption, is supplied to the internal combustion engine 2 at 6 and 7, preferably to the crankshaft 8 of the engine. Gearing mechanisms are provided at 9 and 10 between the crankshaft 8 and the waste heat turbine unit 3.

The waste heat turbine unit 3 comprises a rotating member such as cylinder 11. Cylinder 11 is constructed as a hollow member and has a steam turbine unit 12 connected thereafter, these components being arranged in a housing 14; the steam turbine unit 12 is followed by a condenser 13. By means of a device 15, liquid medium is supplied to the cylinder 11 which evaporates and is expanded in the steam turbine unit 12 with power generation. The liquid medium can be withdrawn from the coolant of the internal combustion engine.

Figure 2:
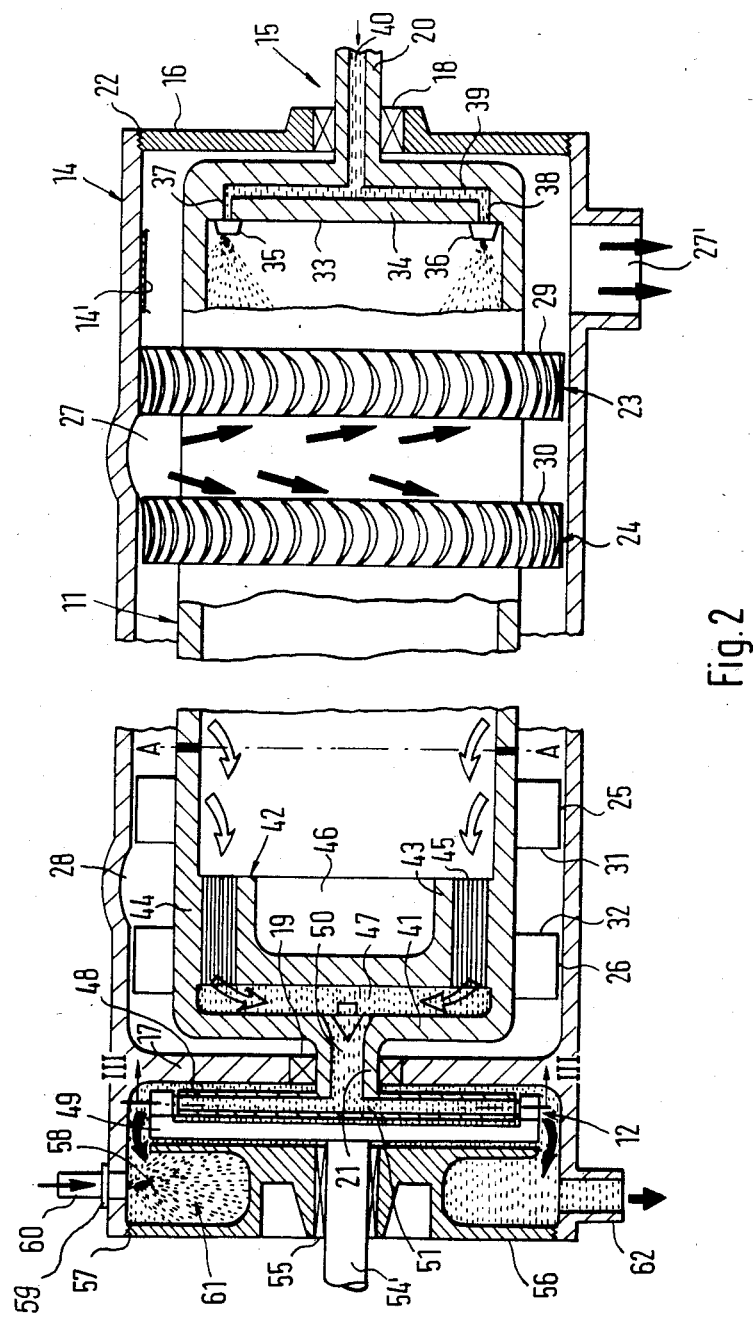
FIG. 2 is an enlarged sectional view taken along line II—II of FIG. 1.
Figure 3:
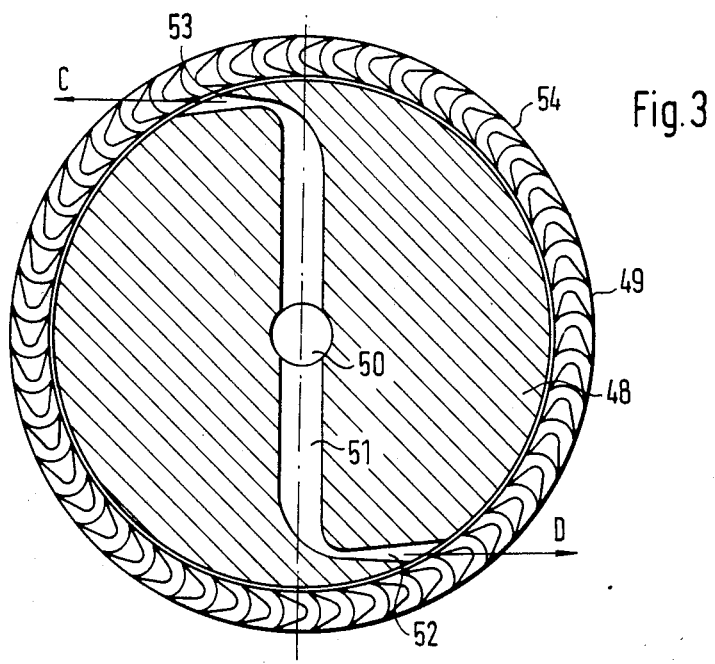
FIG. 3 is a sectional view taken along line III—III of FIG. 2.

The housing 14 includes transverse walls 16, 17 (FIG. 2) provided with bearings 18, 19 for bearing shafts 20, 21 of the cylinder 11. The cylinder 11 can be composed of two parts joined in the plane A—A. Alternatively, it is possible to form the cylinder by utilizing a tubular member equipped with inserts at the end faces. The transverse wall 16 is a separate component and is held to the housing 14 by means of a thread 22.

Blading 23, 24, 25, 26 is arranged on the outside (exterior surface) of the cylinder 11, which latter consists of light-metal alloy; the blading is exposed to the exhaust gases from the internal combustion engine 2. The exhaust gases exit from the housing 14 at exhaust port 27'. The housing 14 can likewise be made of a light-metal alloy. In such a case, the housing 14 is equipped on its inside with a coating 14' of a refractory material, such as a ceramic material.

The blading 23, 24, 25, 26 is arranged in the zones 27, 28 of the inlet of the exhaust gases and is part of wheel rims 29, 30, 31, 32. The wheel rims 29, 30, 31, 32 can be produced as one piece with the cylinder 11 by a casting method. It is also possible to manufacture these wheel rims as separate parts and then mount them by shrink-fitting or some other suitable procedure. In the embodiment shown in the figures, the exhaust gas is fed tangentially between two spaced-apart wheel rims, namely 29 and 30, and 31 and 32, respectively. It is also feasible to provide merely one wheel rim to which the exhaust gas is then also applied tangentially.

The device 15 for supplying a liquid medium includes atomizer nozzles 35, 36 on the inside 33 of one end wall such as first end wall 34. These atomizer nozzles 35, 36 are connected to ducts 37, 38 of a centrigugal pump 39 integrated into the end wall 34. The ducts 37, 38 terminate in the cylinder 11. This centrifugal pump 39 is supplied with the liquid medium by way of a bore 40 in the bearing shaft 20.

The cylinder 11 is provided with a steam superheater 42 adjacent to the other (second) end wall 41. The steam superheater 42 is comprised of a local core 43 extending in the direction transverse of the cylinder 11 continuously therethrough and includes adjacent to the outer surface 44 of the cylinder member 11, several or a plurality of axially extending passage openings 45. On the side of the core 43 facing the first end wall 34, the core 43 is provided with a trough-like recess 46 for weight reasons.

In order to feed the operating medium coming from the steam superheater 42 for proper functioning to the steam turbine unit, a chamber 47 is provided between the end wall 41 and the steam superheater 42.

The steam turbine unit 12 is disposed within the housing 14 on the other side of the partition 17. The steam turbine unit 12 comprises two oppositely rotating turbine wheels 48, 49. The first, or inner turbine wheel 48 is fixedly connected to the bearing shaft 21 of the cylinder 11. Shaft 21 includes a bore 50 which, through radially extending passageway 51, is in communication with expansion nozzles 52, 53. The expansion nozzles 52, 53 of the turbine wheel 48, are preferably laval nozzles, and are effective in the circumferential directions C and D. The second or outer turbine wheel 49 is a radial-flow turbine wheel which with its blading 54 surrounds the first turbine wheel 48. Second turbine wheel 49 is supported with its bearing shaft 54' in a closing wall 56 of the housing 14 with interposition of a bearing 55.

The closing wall 56 is held in the housing 14 by means of a thread 57 and forms a chamber 58 to which is or are connected, at 59, one or several cooling medium atomizer nozzles 60, thus forming a mixture condenser 61. At outlet 62, the coolant-condensate mixture is discharged and conducted to a radiator of the internal combustion engine (not shown). This mixture condenser 61 obviates the need for a separate condenser such as condenser 13 shown in FIG. 1.

The liquid medium supplying device 15 cooperates with a control device 63. The control device 63 includes a control means 64 connected to a temperature sensor 65 (actual value generator Ta) in the exhaust gas conduit 5 and with a desired value generator 66 determined by the power control element 66' of the internal combustion engine. The control means 64 is furthermore connected to an electric motor 67 of a pump 68 with interposition of a voltage regulator 69.

From the pump 68, a conduit 70 for liquid medium leads to the liquid medium supplying device 15. The conduit 70 extends at 71 within the exhaust gas conduit 5, i.e., it is exposed locally to a surrounding stream of exhaust gas whereby the medium is preheated.

Figure 4:
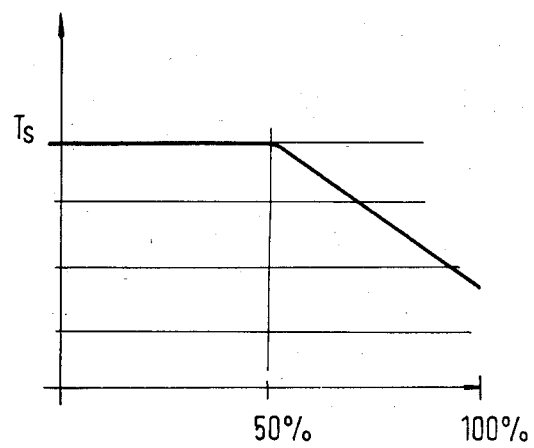
FIG. 4 is a graph illustrating a control function of the drive unit of the present invention.
Figure 5:
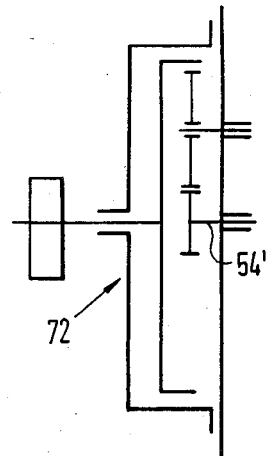
FIG. 5 is an enlarged detail, taken at X of FIG. 1, of the planetary gearing of the present invention.

FIG. 4 illustrates a diagram for explaining the control function of the control device 63. In this diagram, a desired value Ts is plotted on the ordinate, and the setting of the power control element is plotted on the abscissa.

The mode of operation of the drive unit is as follows: During idling or during partial load operation, the exhaust gas temperature Ta is normally lower than the desired value temperature Ts. In this condition, the pump 68 is turned off; no liquid medium is fed to the cylinder 11 which thus acts as a heat accumulator. If the desired value is lowered by a corresponding setting (above 50%) of the power control member, the exhaust gas temperature Ta now being higher than the desired value temperature Ts, then the pump 68 is activated, controlled by the number of revolutions.

Thereby, the liquid medium is introduced via atomizer nozzles 35, 36 into the rotating cylinder 11 where it is evaporated (film evaporation), passes through the steam superheater 42, and expands in the steam turbine unit 12 with power generation.

The energy produced by the exhaust gas stream and acting directly on the cylinder 11 by way of the blading is transmitted directly to the crankshaft 8 via the gearing mechanism 9 which can comprise a freewheel clutch. The second turbine wheel 49, transmitting the energy of the superimposed steam process, must therefore be reversed in its direction of rotation. This reversal is effected by means of a planetary gearing 72 arranged after the turbine wheel 49. An infinitely variable gearing mechanism can be used for power transmission between the planetary gearing 72 and the crankshaft 8.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. In a drive unit including an internal combustion engine and a waste heat turbine unit operated by the exhaust gases of the internal combustion engine for utilizing the energy from the exhaust gases, the waste heat turbine unit comprising a rotatable cylinder member having an exterior and a hollow interior, blading exposed to the exhaust gases and carried on the exterior of the cylinder member, a steam turbine unit, and means for supplying a liquid medium, convertible into steam, to the interior of the cylinder member, the medium being expandable in the steam turbine unit for generating power.

2. The drive unit of claim 1, further comprising a housing surrounding the cylinder member, the housing being provided with bearings for the cylinder member.

3. The drive unit of claim 2, wherein the steam turbine unit is disposed within the housing, downstream in the flow of the steam from the cylinder member.

4. The drive unit of claim 2, further comprising a transverse partition disposed between the cylinder member and the steam turbine unit, said partition including a bearing for the cylinder member.

5. The drive unit of claim 2, further comprising a closing wall mounted to the housing adjacent to the steam turbine unit, wherein the steam turbine unit includes a second turbine wheel and the closing wall includes a bearing for the second turbine wheel.

6. The drive unit of claim 2, wherein the housing is comprised of an aluminum alloy having a coating of a refractory material on its interior.

7. The drive unit of claim 6, wherein the refractory material consists of a ceramic material.

8. The drive unit of claim 1, further comprising a housing for enclosing the cylinder member and the steam turbine unit, wherein the steam turbine unit is disposed in the housing downstream in the flow of steam from the cylinder member.

9. The drive unit of claim 1, wherein the cylinder member is comprised of a light metal alloy.

10. The drive unit of claim 1, further comprising an inlet zone into which the exhaust gases flow, wherein the blading is provided only in the inlet zone.

11. The drive unit of claim 10, wherein the inlet zone includes an inlet, and the blading includes first and second spaced-apart wheel rims, the inlet being positioned to feed the exhaust gases between the first and second spaced-apart wheel rims.

12. The drive unit of claim 11, further comprising a second inlet zone having third and fourth spaced-apart wheel rims disposed therein and a second inlet positioned to feed the exhaust gases between the third and fourth spaced-apart wheel rims.

13. The invention of claim 1, wherein the blading is provided on a wheel rim member.

14. The invention of claim 13, wherein the wheel rim member is made of one piece with the cylinder member.

15. The drive unit of claim 13, wherein the wheel rim member and cylinder member are separate components.

16. The drive unit of claim 13, wherein the wheel rim member comprises a plurality of wheel rim members formed as components separate from the cylinder member, each wheel rim member including individual blades.

17. The drive unit of claim 1, wherein said means for supplying a liquid medium includes atomizer nozzles disposed in the interior of the cylinder member.

18. The drive unit of claim 17, wherein the means for supplying a liquid medium includes a centrifugal pump having ducts which terminate in the cylinder member and are connected to the atomizer nozzles.

19. The drive unit of claim 1, wherein the cylinder member includes an end wall and the means for supplying a liquid medium includes a centrifugal pump mounted to the end wall.

20. The drive unit of claim 19, wherein the centrifugal pump is integrated into the cylinder member.

21. The drive unit of claim 19, wherein the cylinder member includes a second end wall and a steam superheater disposed adjacent to the second end wall.

22. The drive unit of claim 1, wherein the cylinder member includes a first end wall and a second end wall and a steam superheater disposed adjacent to the second end wall.

23. The drive unit of claim 22, wherein the steam superheater comprises a locally arranged core extending in a direction generally transverse of the cylinder member, said core having a plurality of axial passage openings disposed adjacent an exterior surface of the cylinder member.

24. The drive unit of claim 23, wherein the exterior surface comprises a radially outwardly facing surface of the cylinder member.

25. The drive unit of claim 23, wherein the core includes a recessed portion facing the first end wall.

26. The drive unit of claim 25, wherein the recessed portion is trough-shaped.

27. The drive unit of claim 23, wherein said core and said second wall are disposed in a spaced relation to define a space therebetween.

28. The drive unit of claim 1, wherein said steam turbine unit comprises first and second oppositely rotating turbine wheels, the first turbine wheel being joined to the cylinder member and including expansion nozzles acting in a circumferential direction, and the second turbine wheel comprising a radial flow turbine wheel which is driven from the inside by steam exiting from the expansion nozzles of the first turbine wheel.

29. The drive unit of claim 1, further comprising a mixture condenser disposed downstream in the flow of steam from the steam turbine unit.

30. The drive unit of claim 29, further comprising a housing at least partially surrounding the cylinder member, wherein the mixture condenser includes a chamber disposed in the housing, a cooling medium atomizer nozzle, and a cooling medium condensate outlet, the cooling medium atomizer nozzle and outlet being in fluid communication with the chamber.

31. The drive unit of claim 1, wherein the liquid medium comprises coolant taken from the cooling system of the internal combustion engine.

32. The drive unit of claim 1, further comprising a conduit for directing liquid medium to the means for supplying a liquid medium to the interior of the cylinder member, the conduit being at least partially surrounded by a flow of exhaust gases from the internal combustion engine.

33. The drive unit of claim 1, further comprising a control means cooperable with said means for supplying a liquid medium to the interior of the cylinder member.

34. The drive unit of claim 33, comprising a pump cooperable with said control means to pump the liquid medium to the cylinder member.

35. The drive unit of claim 33, wherein said internal combustion engine includes a power control member, and wherein said control means controls the means for supplying liquid medium based on a relation between a control variable and a desired value, the control variable being the exhaust gas temperature at an outlet of the waste heat turbine unit and the desired value being a preselected value determined by the position of the power control member of the internal combustion engine.

36. The drive unit of claim 1, further comprising means for transmitting power directly from the cylinder member to the internal combustion engine and means including gearing disposed between the steam turbine unit and the internal combustion engine for transmitting power from the steam turbine unit to the internal combustion engine.

37. The drive unit of claim 1, wherein the hollow interior of the cylinder member extends along the longitudinal axis of the cylinder member.

* * * * *